United States Patent
Fukui et al.

(10) Patent No.: US 7,096,027 B2
(45) Date of Patent: Aug. 22, 2006

(54) COMMUNICATION METHOD, COMMUNICATION SYSTEM AND COMMUNICATION APPARATUS

(75) Inventors: Noriyuki Fukui, Tokyo (JP); Ryouichi Fujie, Tokyo (JP); Masaaki Kusano, Tokyo (JP); Akihiro Shibuya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 191 days.

(21) Appl. No.: 10/486,785

(22) PCT Filed: Oct. 4, 2001

(86) PCT No.: PCT/JP01/08741

§ 371 (c)(1),
(2), (4) Date: Feb. 13, 2004

(87) PCT Pub. No.: WO03/032566

PCT Pub. Date: Apr. 17, 2003

(65) Prior Publication Data

US 2004/0248579 A1     Dec. 9, 2004

(51) Int. Cl.
    *H04Q 7/21*     (2006.01)
(52) U.S. Cl. .................... 455/452.1; 455/450
(58) Field of Classification Search ........... 455/450, 455/403, 452.1, 69, 423, 67.14; 370/335, 370/342, 400

See application file for complete search history.

(56) References Cited

U.S. PATENT DOCUMENTS

2002/0065072 A1*  5/2002  Lindh .................. 455/422

FOREIGN PATENT DOCUMENTS

| JP | 7-123079 | 5/1995 |
| JP | 8-172425 | 7/1996 |
| JP | 10-135935 | 5/1998 |
| JP | 10-164031 | 6/1998 |
| JP | 2001-516177 | 9/2001 |
| WO | WO 99/09698 | * 2/1999 |
| WO | 01/91357 | 11/2001 |

OTHER PUBLICATIONS

3rd Generation Partnership Project; Technical Spectification Group Radio Access Network; Physical Layer Aspects of UTRA High Speed Downlink Packet Access (Release 2000), 3G TR 25.848 V0.6.0 (May 2000), pp. 14, 27 and 78.

* cited by examiner

*Primary Examiner*—Temica Beamer
*Assistant Examiner*—Joy Contee
(74) *Attorney, Agent, or Firm*—Oblon, Spivak, McClelland, Maier & Neustadt, P.C.

(57) ABSTRACT

A transmitting station receives, from one of receiving-stations to which it has been assigned a communication channel, a retransmission request indicating retransmission of a particular frame, switches the communication with the one receiving station to a communication according to an SAW (Stop and Wait) scheme, retransmits the particular frame according to the SAW scheme to the one receiving station, assigns the communication channel that was assigned to the one receiving station another receiving station, and switches the communication with the one receiving station to the successive transmission upon reception from the one receiving station of a reply indicative of correct reception of the particular frame.

16 Claims, 18 Drawing Sheets

COMMUNICATION METHOD, COMMUNICATION SYSTEM AND COMMUNICATION APPARATUS

TECHNICAL FIELD

The present invention relates to a communication method, a communication system, and a communication device that use of an ARQ (Automatic Repeat request) scheme. More specifically, the present invention relates to a communication method, a communication system and a communication device that realizes optimal channel assignment (scheduling) in a one (i.e., one transmitter) to n (i.e., n receivers).

BACKGROUND ART

FIG. 11 illustrates a-conventional communication system. This communication system includes a base station 101 and n mobile stations 102-1, 102-2, 102-3, . . . ; 102-n, where n is an integer. The base station 101 has m communication channels, where m is an integer smaller than n. Assume that the base station communicates with the n mobile stations via separate wireless communications. In that case, a scheduler is provided in the base station 101 to establish n communications via limited m channels. The scheduler performs scheduling of n communications to m channels.

FIGS. 12A and 12B are diagrams to explain the scheduling. FIG. 12A illustrates a scheme for uniform scheduling that does not take into account the traffic volume while FIG. 12B illustrates a scheme for scheduling that takes into account the traffic volume. It is assumed here that there are six base stations and three channels.

As illustrated in FIG. 12A, a channel (1), a channel (2), and a channel (3) are assigned to the mobile stations 102-1, 102-2, and 102-3 respectively at time t(1) while the channel (1), the channel (2), and the channel (3) are assigned to the mobile stations 102-4, 102-5, and 102-6 respectively at time t(2). The same channel assignment is performed at time t(3) and time t(4) as that performed at time t(1) and time t(2), respectively. In other words, the channels are assigned turn-by-turn irrespective of the amount of data to be transmitted (i.e., traffic). In this system, no channel is assigned to a mobile station to which no data is to be transmitted.

In the case of FIG. 12B it is assumed that the mobile stations 102-2 and 102-4 have large traffic and the other mobile stations have less traffic. In this case, the channels are preferentially assigned to the mobile stations 102-2 and 102-4 at time t(1) and time t(2) while the channels are assigned to the other mobile stations also at time t(3) and time t(4). The scheduling is performed again when there is a change in the traffic as time passes.

Sometimes the quality of the communication line degrades due to noise or the communication interference from another station. One approach to improve the quality is to perform error correction. However, even the error correction does not always result into better quality. The ARQ transmission scheme is used to perform "retransmission" for transmitting a unit of data (i.e., frame) again which cannot be restored by an error correction technique. Selective Repeat (SR), Go Back N (GBN), Stop and Wait (SAW) etc. are the examples of ARQ transmission scheme.

FIG. 13 illustrates the SR scheme in one-to-one communications. In this scheme, only the frames that included error are retransmitted. A receiving station, upon detection of an error in a frame "2", sends a request to the transmitting station for retransmission of the frame "2". The receiving station saves, in a buffer, frames "3" to "7", that do not include an error. Upon re-reception of the frame "2", which now includes no error, all the frames are passed to an upper layer in an appropriate order.

The receiving station periodically reports the current receiving status to the transmitting station. Concretely, the receiving station returns the latest frame number until which the frames have been received without error. This report is referred to as a "reception notification" and it is indicated by broken line arrows in FIG. 13. The receiving station reports, as a first reception notification, frame number "1", because, frame "1" is received properly but frame "2" included an error. The receiving station reports, as a second reception notification, frame number "8", because, all the frames from "1" to "8" have been received properly.

FIG. 14 illustrates the BGN scheme in a one-to-one communication. In this scheme, all the frames transmitted after a frame that includes an error are retransmitted. A receiving station, upon detection of an error in a frame "2", sends a request to the transmitting station for retransmission of the frame "2" and discards all the frames that are received after the frame "2". Upon reception of the retransmission request, the transmitting station retransmits the frame "2" as well as all the frames that were transmitted subsequent to the frame "2" until the reception of the retransmission request. The receiving station returns reception notifications in the same manner as in the SR scheme. In other words, the receiving station reports, as a first reception notification, the frame number "1" and reports, as a second reception notification, the frame number "3".

FIG. 15 illustrates the SAW scheme in a one-to-one communication. In this scheme, the transmitting station transmits a new frame only upon reception from the receiving station of an affirmative acknowledgement (ACK) corresponding to the previous frame and transmits the same frame as the previous frame upon reception of a negative acknowledgement (NAK) from the receiving station. In other words, the NAK is treated as a retransmission request.

A conventional scheduler, which is being standardized by 3GPP (3rd Generation Partnership Project), will now be explained. The 3GPP is one of the standard setting organizations of the 3rd generation mobile communication. FIG. 16 is a schematic of the base station. The base station includes transmission control units 111-1, 111-2, . . . , 111-n, transmission buffers 112-1, 112-2, . . . , 112-n, and a scheduler 113.

The base station includes a transmission control unit and a transmission buffer corresponding to each mobile station (102-1 to 102-n) communicating with the base station 101. The transmission buffer serves to store data passed from the upper layer. Upon reception of the data from the upper layer or reception of a retransmission request or an NAK from a mobile station, the respective transmission control units sends a transmission request and a notification of the amount of transmission data, to the scheduler. The scheduler 113 preferentially assigns channels to mobile stations which are capable of providing a better communication quality with reference to the transmission requests, the amounts of transmission data, and the qualities of communication line notified by the respective transmission control units. The quality of communication line is determined from the average of measurements performed repeated at the respective mobile stations.

Also, upon reception of a reception notification or an ACK notification from a mobile station, each transmission control unit deletes the data corresponding to the frame number specified by the notification together with data corresponding to the frame numbers preceding the specified frame number because the data need no longer be retransmitted.

Incidentally, the ARQ transmission scheme of a prior art transmission control unit may be designed by making use of any one of the usual SR, BGN, and SAW, or alternatively Nch(N channel)-SAW such as HSDPA (High Speed Data Packet Access) of 3GPP in which n SAW units are arranged in parallel. FIG. 17 illustrates an N-ch SAW scheme. In a 1-ch SAW scheme illustrated in FIG. 15, the performance is not good, because, the communication line is not fully used. In the N-ch SAW scheme, therefore, the same communication is divided into N channels each of which is used to perform an individual transmission thread respectively. For example, as shown in FIG. 17, the transmission 1-0 is performed to transmit a frame "0" via the first channel while the transmission 3-0 is performed to transmit the frame "0" via the third channel.

However, the conventional communication system has problems as discussed below.

FIG. 18 is to explain these problems. It is assumed here that the scheme is GBN scheme. Meanwhile, the same explanation is true in the case of the SR, SAW, and the Nch-SAW-ARQ schemes.

It is also assumed that a transmitting station transmits data to a receiving station A. The receiving station A detects the quality of communication line for several times to repeatedly report the average value thereof in a predetermined timing. The receiving station A reports the quality of communication line (see chained line arrows). As there is degradation in the quality of communication line after reception of a frame "A6", the fact that the quality has degraded is reported with a second notification i.e., "low quality".

On the other hand, after transmitting a frame "A11", the transmitting station receives a NAK in association with the frame "A6" followed by transmitting frames. "A6", "A7" and "A8" via the channel being assigned to the receiving station A. Then, when a "low quality" is notified by the receiving station A, channel assignment to the receiving station A is halted to assign the channel to another receiving station B followed by transmitting frames "B0" and "B1".

In this manner, since the average value of the quality of communication line is notified from the receiving station A to the transmitting station, there is a time lag before the transmitting station receives the average value. That is, the time slot in which the receiving station A measures the quality of communication line is different from the time slot in which the transmitting station receives the notification, resulting in a differential quality of communication line, and therefore there is a problem that the transmitting station continues assigning a channel to the receiving station A even in the time slot in which the quality of communication line is low.

DISCLOSURE OF THE INVENTION

It is an object of the present invention to solve at least the problems in the conventional technology.

A communication method according to one aspect of the present invention is a method of performing channel assignment between a transmitting station and a plurality of receiving stations according to an ARQ (Automatic Repeat request) scheme. The communication method includes the transmitting station assigning a communication channel to at least one receiving station from among the plurality of receiving stations to perform successive transmission of frames with the one receiving station; the transmitting station receiving, from a requestor receiving-station from among the receiving stations to which the transmitting station has assigned the communication channel, a retransmission request indicating retransmission of a particular frame; the transmitting station switching the communication with the requestor receiving-station to a communication according to an SAW (Stop and Wait) scheme that is one implementation of the ARQ scheme; the transmitting station retransmitting the particular frame according to the SAW scheme to the requester receiving-station; the transmitting station assigning the communication channel that is assigned to the requestor receiving-station to another receiving station, by making use of the fact that there is a decrease in the number of frames to be transmitted in the SAW scheme, and giving a priority to the communication with the another receiving station; the transmitting station switching the communication with the requestor receiving-station to the successive transmission upon reception from the requestor receiving-station of a reply signal indicative of reception of the particular frame as retransmitted without error, and giving a priority to the communication with the requester receiving-station.

A communication method according to another aspect of the present invention is a method of performing channel assignment between a transmitting station and a plurality of receiving stations. The communication method includes the transmitting station assigning a communication channel to at least one receiving station from among the plurality of receiving stations to perform successive transmission of frames with the one receiving station; the transmitting station receiving, from a requestor receiving-station from among the receiving stations to which the transmitting station has assigned the communication channel, a retransmission request; the transmitting station stopping the communication established with the requester receiving-station; the transmitting station assigning the communication channel to a receiving station other than the requestor receiving-station and giving a priority to the communication with that receiving station; the transmitting station checking whether information relating to the quality of communication line has been received from the requestor receiving-station, and upon the information relating to the quality of communication line indicating that the quality of communication line has recovered, resuming communication with the requester receiving-station.

A communication system according to still another aspect of the present invention includes a transmitting station and a plurality of receiving stations. The transmitting station includes a unit that assigns a communication channel to at least one receiving station from among the plurality of receiving stations to perform successive transmission of frames with the one receiving station; receives, from a requestor receiving-station from among the receiving stations to which the transmitting station has assigned the communication channel, a retransmission request indicating retransmission of a particular frame; switches the communication with the requestor receiving-station to a communication according to an SAW (Stop and Wait) scheme that is one implementation of the ARQ scheme; retransmits the particular frame according to the SAW scheme to the requestor receiving-station; assigns the communication channel that is assigned to the requester receiving-station, by making use of the fact that there is a decrease in the number of frames to be transmitted in the SAW scheme, and giving a priority to the communication with that receiving station; switches the communication with the requestor receiving-station to the successive transmission upon reception from the requestor receiving-station of a reply signal indicative of reception of the particular frame as retransmitted without error, and gives a priority to the communication with the requestor receiving-station.

A communication system according to still another aspect of the present invention includes a transmitting station and a plurality of receiving stations. The transmitting station includes a unit that assigns a communication channel to at least one receiving station from among the plurality of receiving stations to perform successive transmission of frames with the one receiving station; receives, from a requestor receiving-station from among the receiving stations to which the transmitting station has assigned the communication channel, a retransmission request; stops the communication established with the requestor receiving-station; assigns the communication channel to a receiving station other than the requestor receiving-station and gives a priority to the communication with that receiving station; checks whether information relating to the quality of communication line has been received from the requestor receiving-station, and upon the information relating to the quality of communication line indicating that the quality of communication line has recovered, resumes communication with the requestor receiving-station.

A transmitting side communication device according to still another aspect of the present invention assigns a channel to a plurality of receiving side communication devices according to an ARQ (Automatic Repeat request) scheme. The transmitting side communication device includes a unit that assigns a communication channel to at least one receiving side communication device from among the plurality of receiving side communication devices to perform successive transmission of frames with the one receiving side communication device; receives, from a requestor receiving side communication device from among the receiving side communication devices to which the transmitting station has assigned the communication channel, a retransmission request indicating retransmission of a particular frame; switches the communication with the requestor receiving side communication device to a communication according to an SAW (Stop and Wait) scheme that is one implementation of the ARQ scheme; retransmits the particular frame according to the SAW scheme to the requestor receiving side communication device; assigns the communication channel that is assigned to the requestor receiving side communication device to a receiving side communication device other that the requester receiving side communication device, by making use of the fact that there is a decrease in the number of frames to be transmitted in the SAW scheme, and gives a priority to the communication with that receiving side communication device; switches the communication with the requester receiving side communication device to the successive transmission upon reception from the requestor receiving side communication device of a reply signal indicative of reception of the particular frame as retransmitted without error, and gives a priority to the communication with the requestor receiving side communication device.

A transmitting side communication device according to still another aspect of the present invention assigns a channel to a plurality of receiving side communication devices.

The transmitting side communication device includes a unit that assigns a communication channel to at least one receiving station from among the plurality of receiving stations to perform successive transmission of frames with the one receiving station; receives, from a requestor receiving-station from among the receiving stations to which the transmitting station has assigned the communication channel, a retransmission request; stops the communication established with the requestor receiving-station; assigns the communication channel to a receiving station other than the requestor receiving-station and gives a priority to the communication with that receiving station; checks whether information relating to the quality of communication line has been received from the requestor receiving-station, and upon the information relating to the quality of communication line indicating that the quality of communication line has recovered, resumes communication with the requestor receiving-station.

A receiving communication device according to still another aspect of the present invention performs a communication with a transmitting side communication device according to an ARQ scheme. The receiving communication device includes a unit that upon a frame retransmitted from the transmitting side communication device is correctly received, transmits a first reply signal together with information indicative of correct reception of a retransmitted frame to the transmitting side communication device; and upon the frame retransmitted causes a receiving error again and if a frame obtained by a packet reconstructing process includes no error, transmits a second reply signal together with information indicative of a receiving error of a retransmitted frame to the transmitting side communication device.

The other objects, features and advantages of the present invention are specifically set forth in or will become apparent from the following detailed descriptions of the invention when read in conjunction with the accompanying drawings.

BEST MODE FOR CARRYING OUT THE INVENTION

Exemplary embodiments of the present invention will be explained in detail while referring to the accompanied drawings.

In a first embodiment, while a communication device in a transmitting side normally operates in a successive transmitting mode, the operation mode is switched to an SAW mode when a retransmission request or an NAK is received and then switched again to the successive transmitting mode when the notification of a retransmitted frame acknowledgement is received as a reception notification or an ACK.

Figure 1:
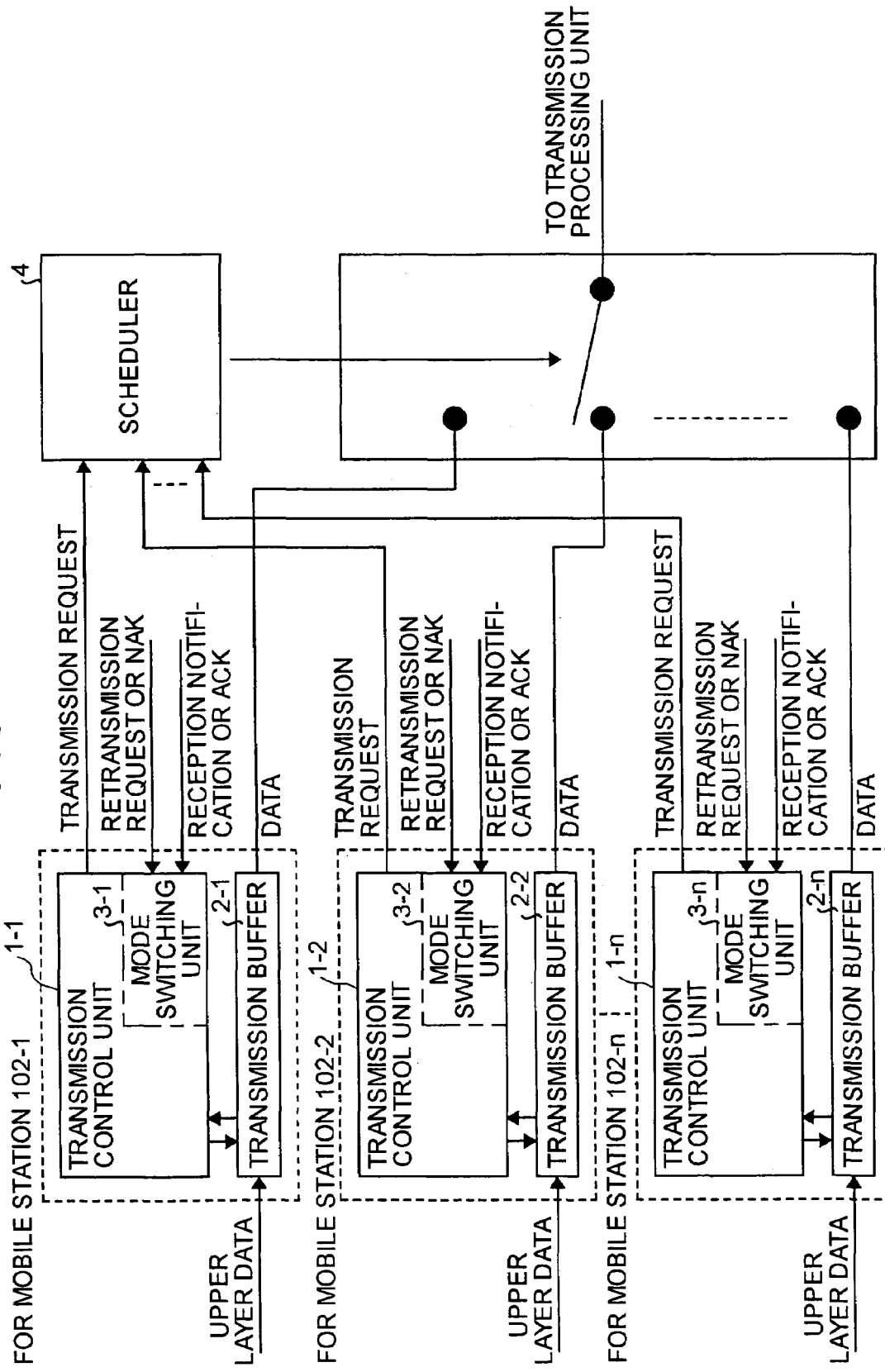
FIG. 1 is a communication device according to a first embodiment of the present invention.
Figure 11:
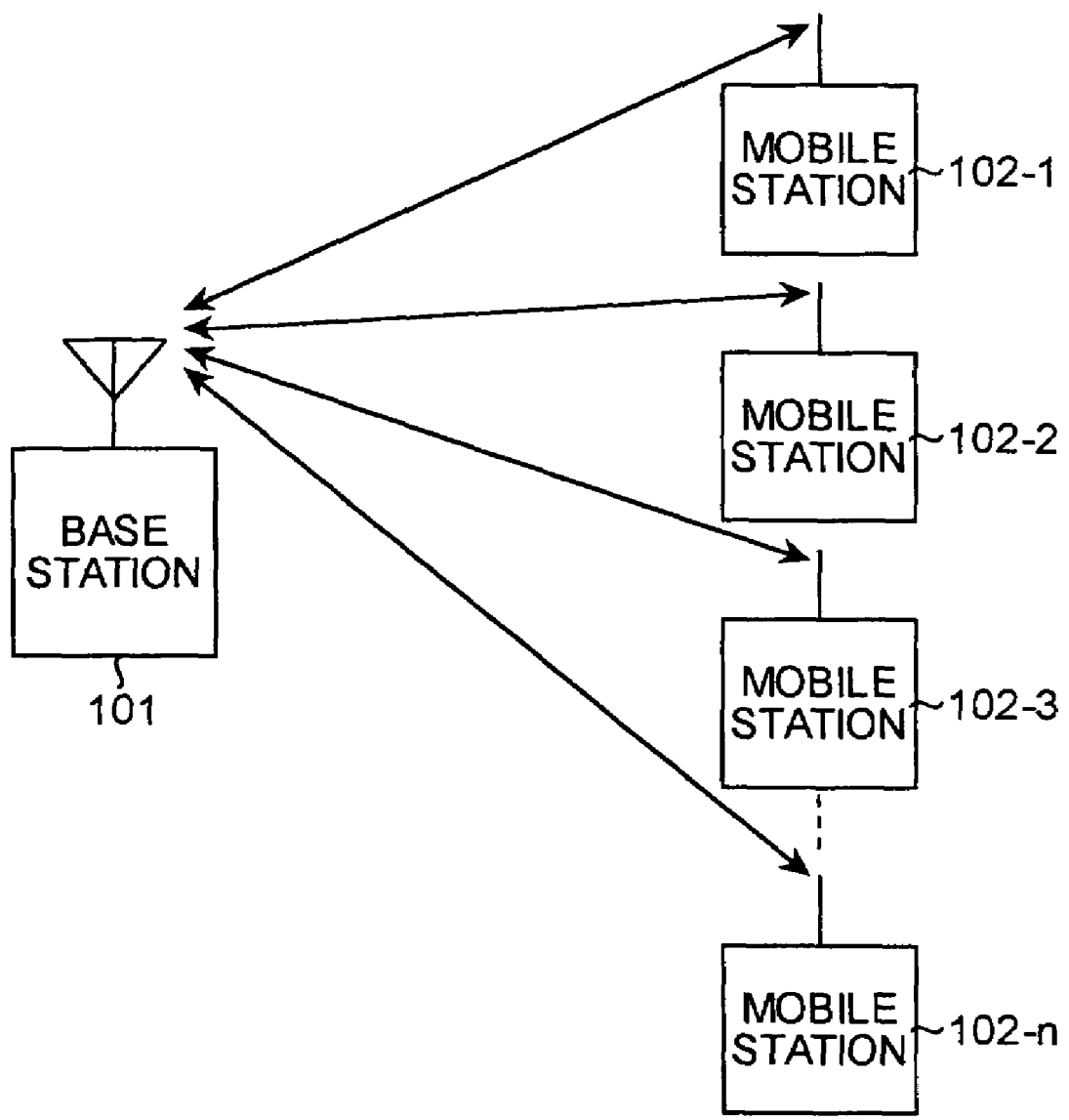
FIG. 11 shows a communication system for realizing a prior art communication method.
Figure 12:
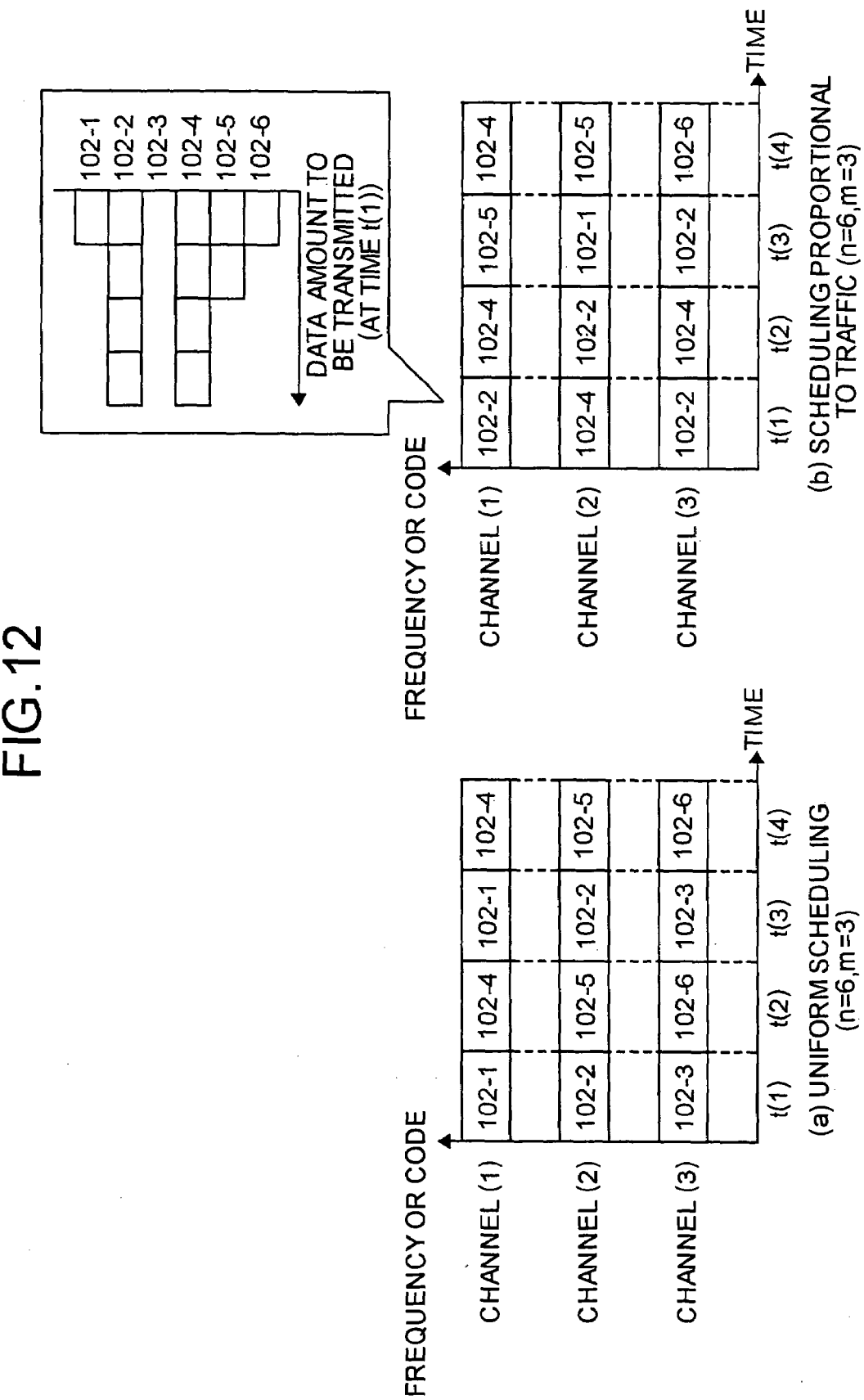
FIGS. 12A and 12B are diagrams showing exemplary scheduling schemes for transmitting data from a base station to respective mobile stations.
Figure 13:
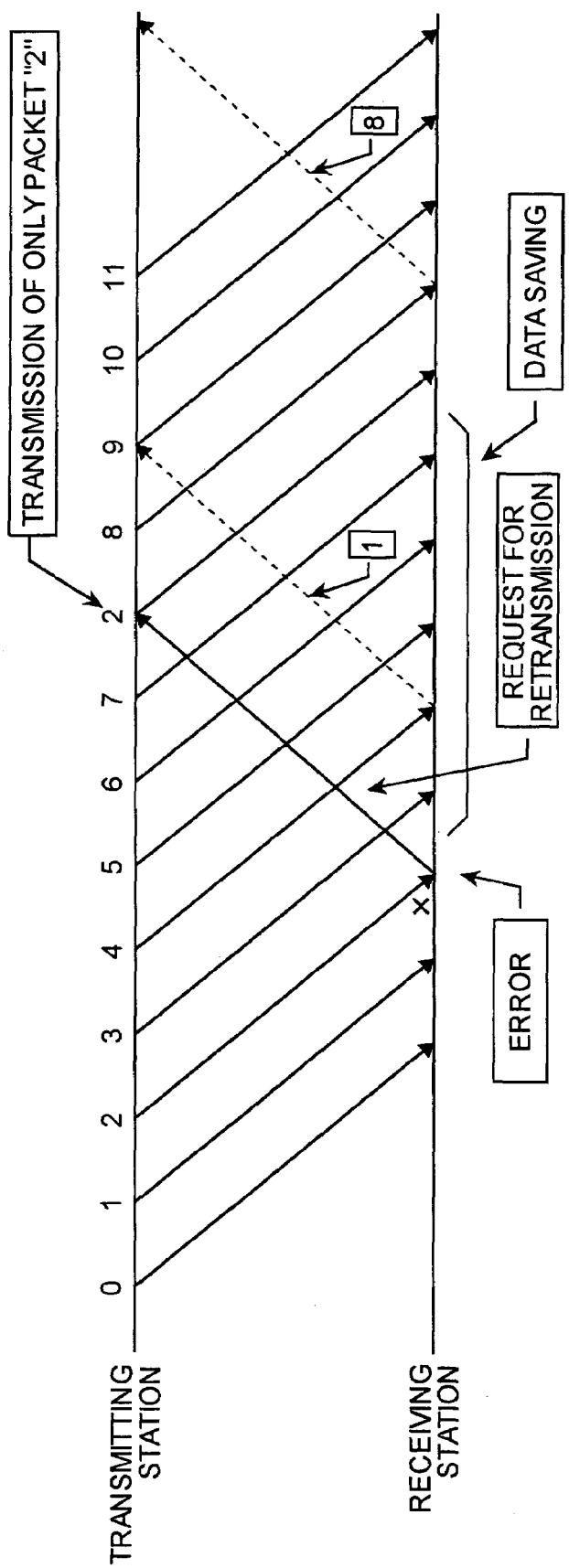
FIG. 13 is a view for explaining an SR-ARQ scheme in a one-to-one communication.
Figure 14:
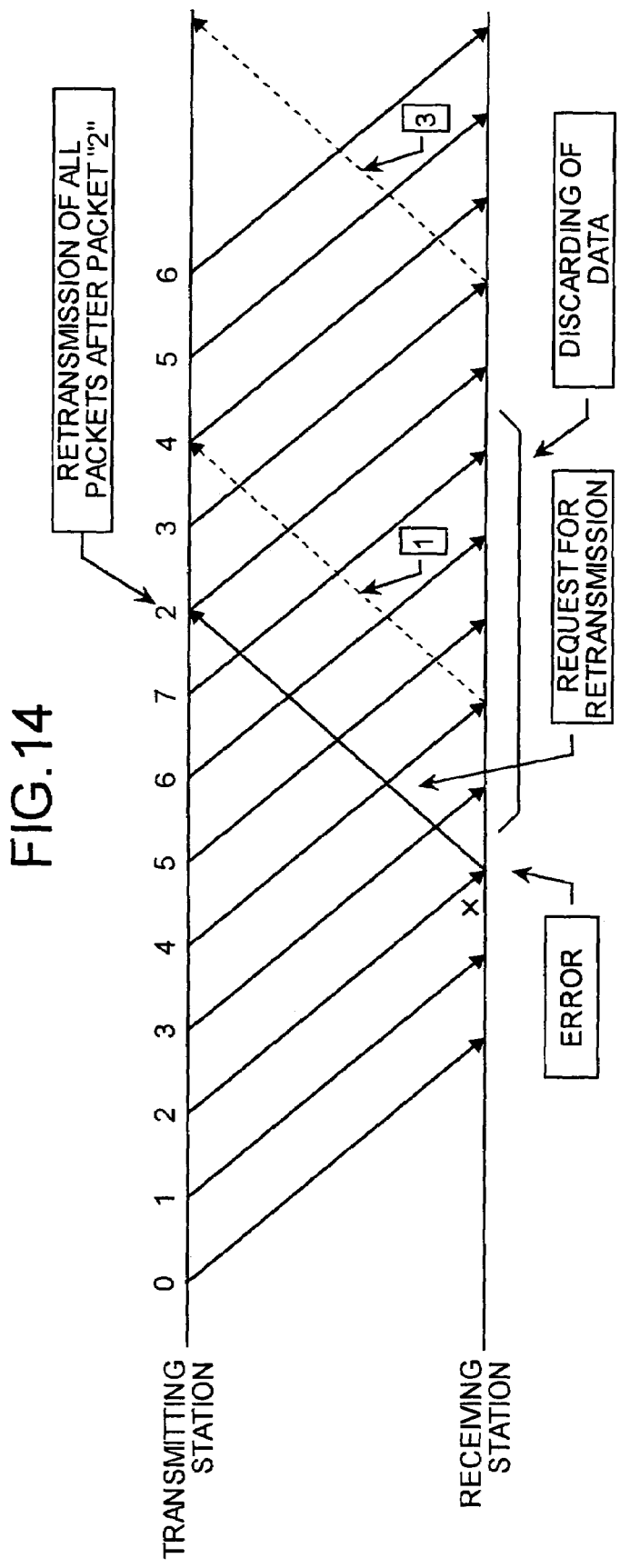
FIG. 14 is a view for explaining a BGN-ARQ scheme in a one-to-one communication.
Figure 15:
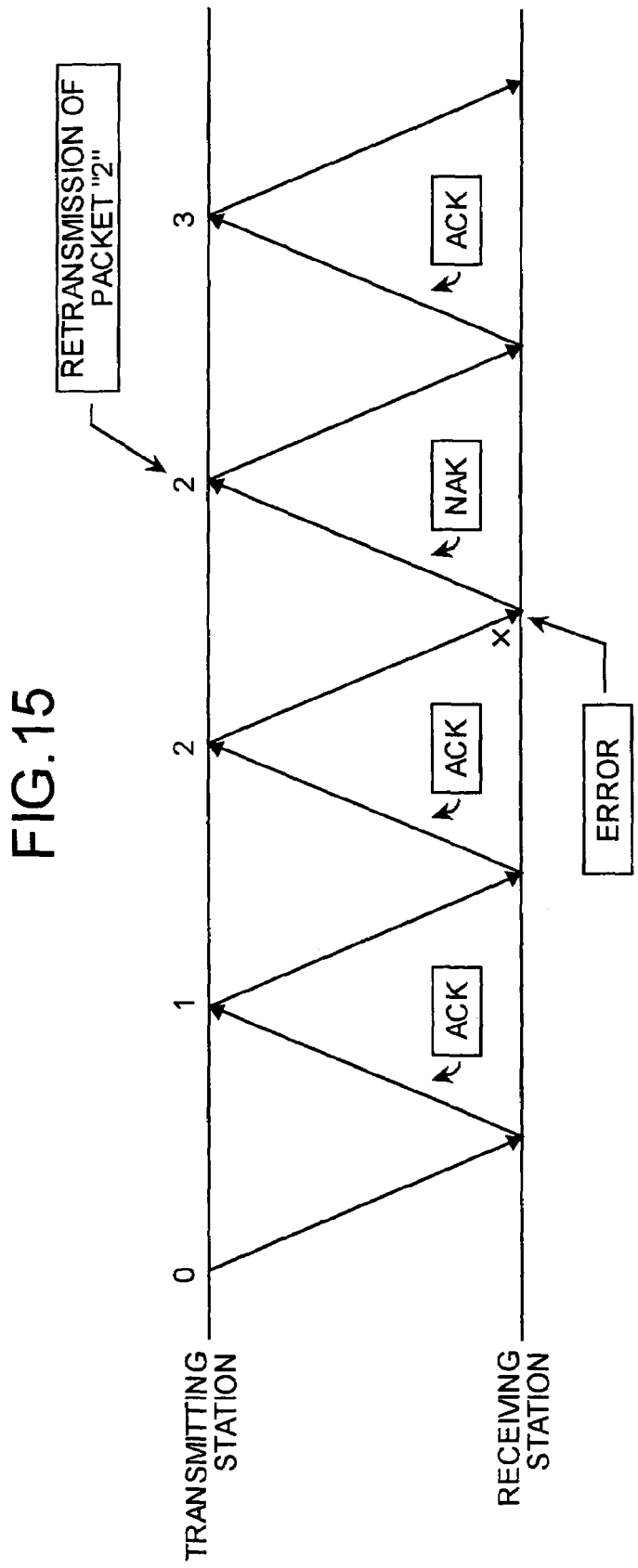
FIG. 15 is a view for explaining an SAW-ARQ scheme in a one-to-one communication.
Figure 16:
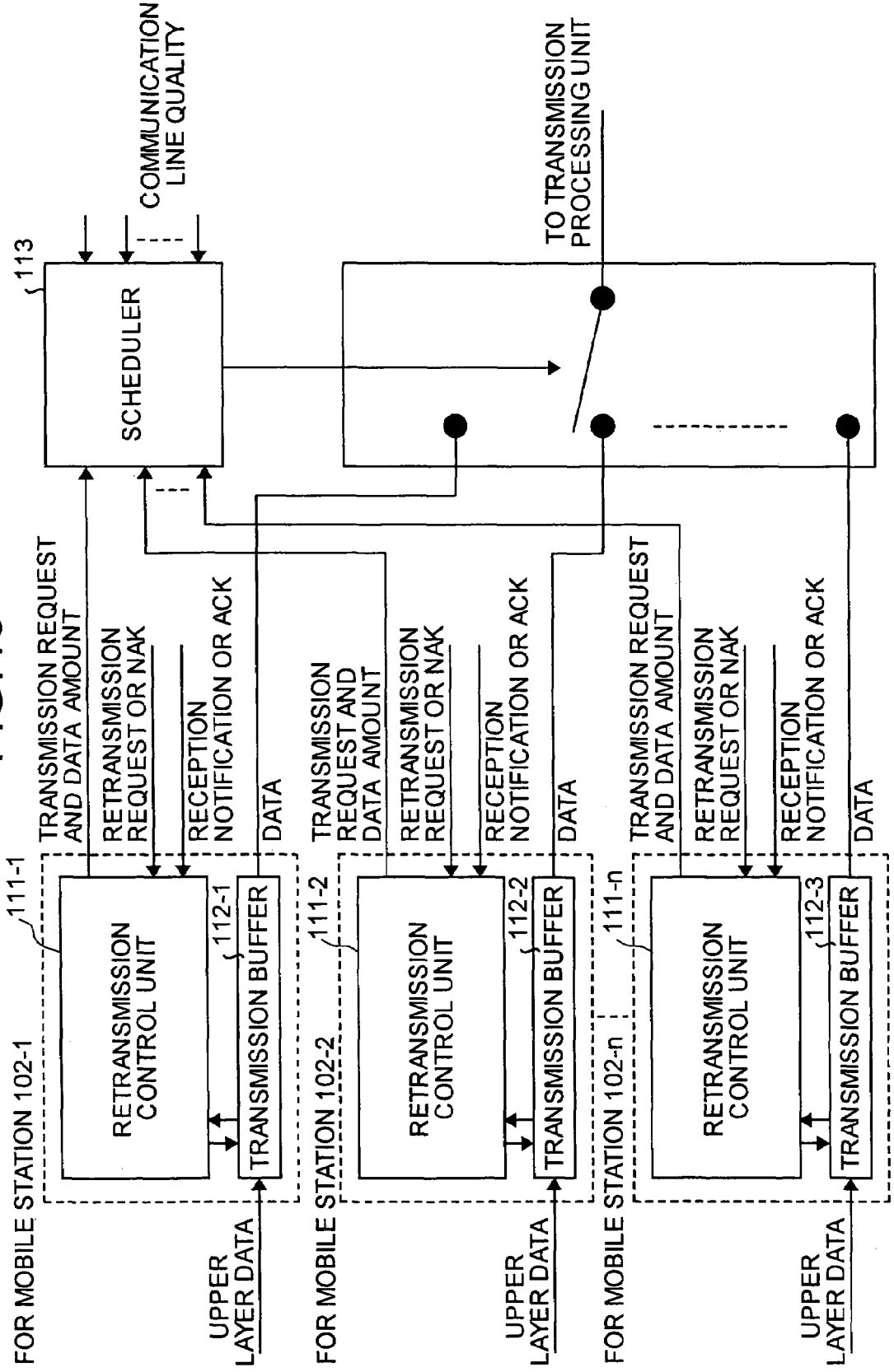
FIG. 16 is a schematic diagram showing the base station as illustrated in FIG. 11.
Figure 17:
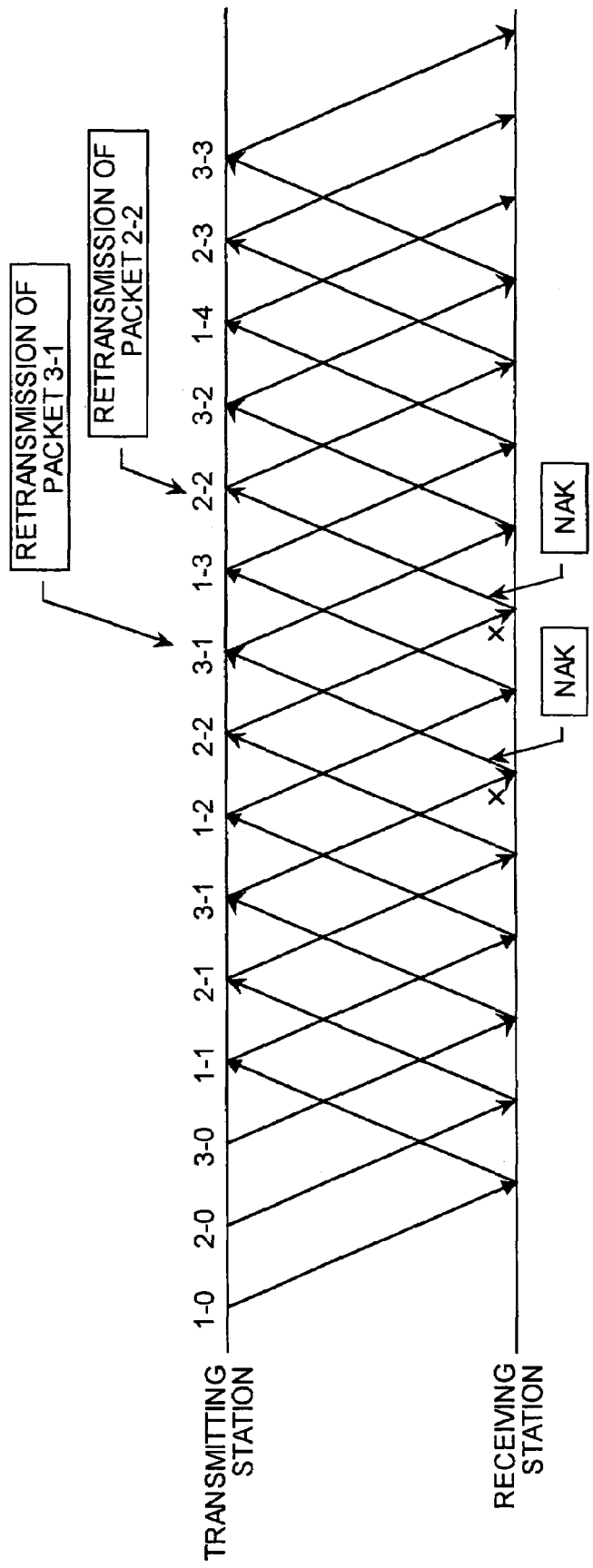
FIG. 17 is a schematic diagram showing an N-ch SAW scheme where N=3.
Figure 18:
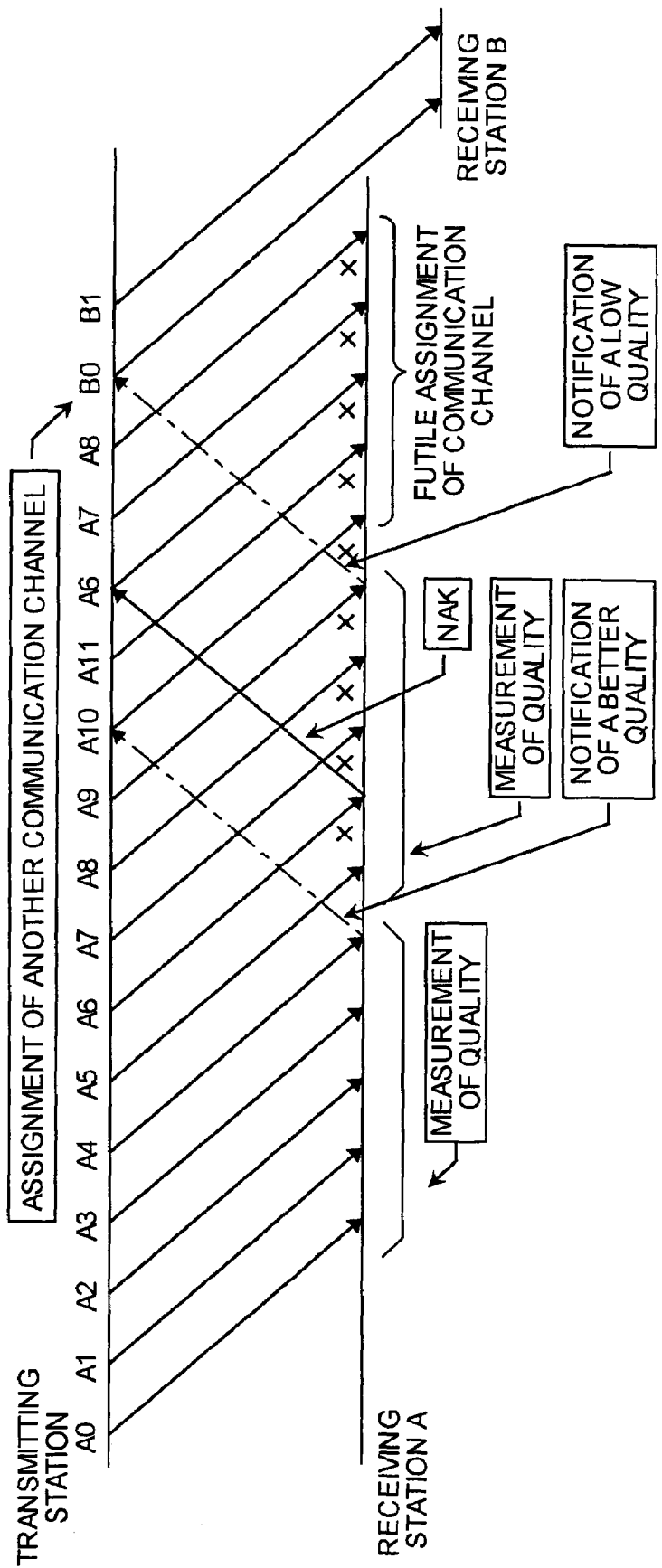
FIG. 18 is a view for explaining the problem encountered in the prior art technique.

FIG. 1 illustrates a communication device according to the first embodiment of the present invention. Reference numerals 1-1, 1-2, . . . , 1-$n$ designate transmission control units; 2-1, 2-2, . . . , 2-$n$ designate transmission buffers; 3-1, 3-2, . . . , 3-$n$ designate mode switching units provided in the respective transmission control units; and 4 designates a scheduler. In this case, a function of mode switching is added to the configuration as illustrated in FIG. 16 while the scheduler 4 is designed in order not to require information about the quality of communication line as notified by a receiving station. Incidentally, in the case of the first embodiment, while one base station communicates with n mobile stations via n separate wireless communications, the n communications are established via a limited number m of communication channels in the same manner as explained with reference to FIG. 11.

The respective transmission control units and the transmission buffers associated therewith are separately provided for the respective mobile stations (102-1 to 102-$n$) communicating with the base station 101 which serves to store data passed from an upper layer in the transmission buffers. Upon reception of the data passed from the upper layer or receiving a retransmission request or an NAK from a mobile station, the respective transmission control units sends a transmission request to the scheduler. The scheduler 4 serves to assign channels to mobile stations on the basis of the transmission requests as notified by the respective transmission control units. Also, when receiving a reception notification or an ACK notification from a mobile station, each transmission control unit deletes data corresponding to the frame number specified by the notification together with data corresponding to the frame numbers preceding the specified frame number.

On the other hand, each mode switching unit switches the operation mode from the successive transmitting mode (the normal operation mode) to the SAW mode when a retransmission request or an NAK is received from a mobile station. Furthermore, when a reception notification or an ACK is received in the SAW mode, the operation mode is switched to the successive transmitting mode. That is, when a receiving error occurs in a mobile station due to the degradation of the quality of communication line and a retransmission request is received by the transmitting station, the transmission control unit accepting the retransmission request serves to switch the operation mode to the SAW mode and send a transmission request to the scheduler 4 only for the frame corresponding to the retransmission request.

Figure 2:
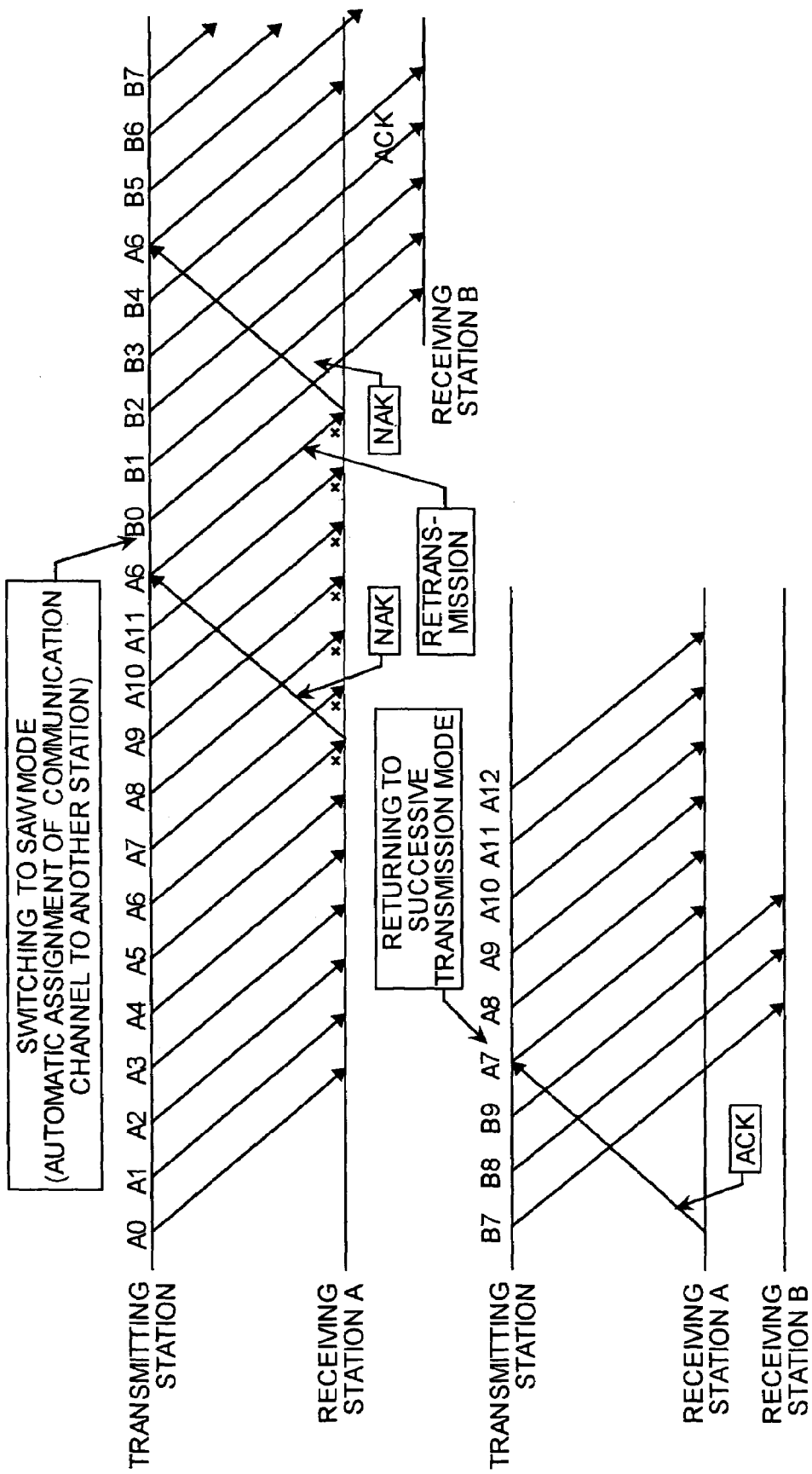
FIG. 2 is to explain the communication method according to the first embodiment.

FIG. 2 is a view to explain the communication method according to the first embodiment. Meanwhile, in what follows, it is assumed for the sake of explanation that the transmitting station is a base station while the receiving station is a mobile station.

The transmitting station assigns a channel to a receiving station A (which may be any one of the mobile station 102-1 to 102-$n$) and transmits a frame in the successive transmitting mode. When a receiving error occurs in a frame "A6", the receiving station A requests, by outputting a NAK, retransmission of the frame "A6".

Upon reception of the retransmission request for the frame "A6", the transmitting station retransmits the frame "A6" and switches the operation mode of the communication established with the receiving station A to the SAW mode. By this procedure, number of transmission requests, sent from the transmission control unit that receives the retransmission request (any one of the transmission control unit 1-1 to 1-$n$) to the scheduler 4 can be reduced. The scheduler 4 assigns the channel to a receiving station B by making use of the decrement of the transmission requests to the receiving station A and then prioritizes the communication with the receiving station B. After retransmission of the frame "A6", the transmitting station transmits frames "B0", "B1", . . . , "B4" to the receiving station B. Then, when the transmitting station receives an NAK of the frame "A6" from the receiving station A, the transmitting station retransmits the frame "A6" followed by transmission of frames "B5", "B6" and so no, to the receiving station B.

Also, when the transmitting station receives an ACK of the frame "A6", the transmission control unit that receives the ACK switches the operation mode to the successive transmitting mode and sends transmission requests to the scheduler 4 in the successive transmitting mode. In this case, the scheduler 4 receives the successive transmission requests and then assigns again a channel to the receiving station A for communication.

Incidentally, the successive transmission to the receiving station A is given priority in the initial state for the purpose of facilitating the understanding the switching scheme between the successive transmitting mode and the SAW mode. However, while the present invention is not limited to such a case, the scheduler 4 serves to equally assign a channel to the receiving station A and the receiving station B when the communication established with the receiving station B is performed in the successive transmitting mode in the same manner as the communication established with the receiving station A.

In this manner, in the first embodiment, each transmission control unit switches the operation mode to the SAW mode when a retransmission request or an NAK is received from a mobile station, followed by requesting the scheduler to retransmit only one erroneous frame. As a result, the scheduler can preferentially assign more channels to receiving stations capable of providing a better communication quality without need for monitoring the quality data of communication line transmitted from receiving stations.

Also, when a retransmission request or an NAK is received from a mobile station, the channel assignment to the mobile station is halted without delay. As a result, it is possible to avoid "the condition that a channel is vainly assigned irrespective of a low communication quality" encountered in the prior art technique. Also, channels are efficiently utilized by avoiding the above described condition, and therefore it is possible to improve the throughput of the entire system.

Next, a second embodiment of the present invention will be explained. According to HSDPA implementations as explained above in conjunction with the prior art technique, a packet reconstructing process is performed at a receiving station. The packet reconstructing process is a process of combining frame data which cannot correctly be received at the first transmission and frame data which can also not correctly be received at the subsequent retransmission, performing error correction and error detection of the combined frame data and then, if no error is detected, sending an ACK indicating that the frame data is data correctly received. On the other hand, according to the second embodiment, the ACK is sent together with additional information indicative of "lone reception failure" when a correct frame data is reconstructed only by the packet reconstructing process while the frame data itself as retransmitted cannot be correctly received. Conversely, when the frame data itself as retransmitted can be correctly received, an ACK is sent together with additional information indicative of "lone reception success". Upon reception of the ACK, the transmitting station confirms the additional information, and continues the SAW mode if the additional information indicates "lone reception failure" or returns to the successive transmitting mode if the additional information indicates "lone reception success".

Figure 3:
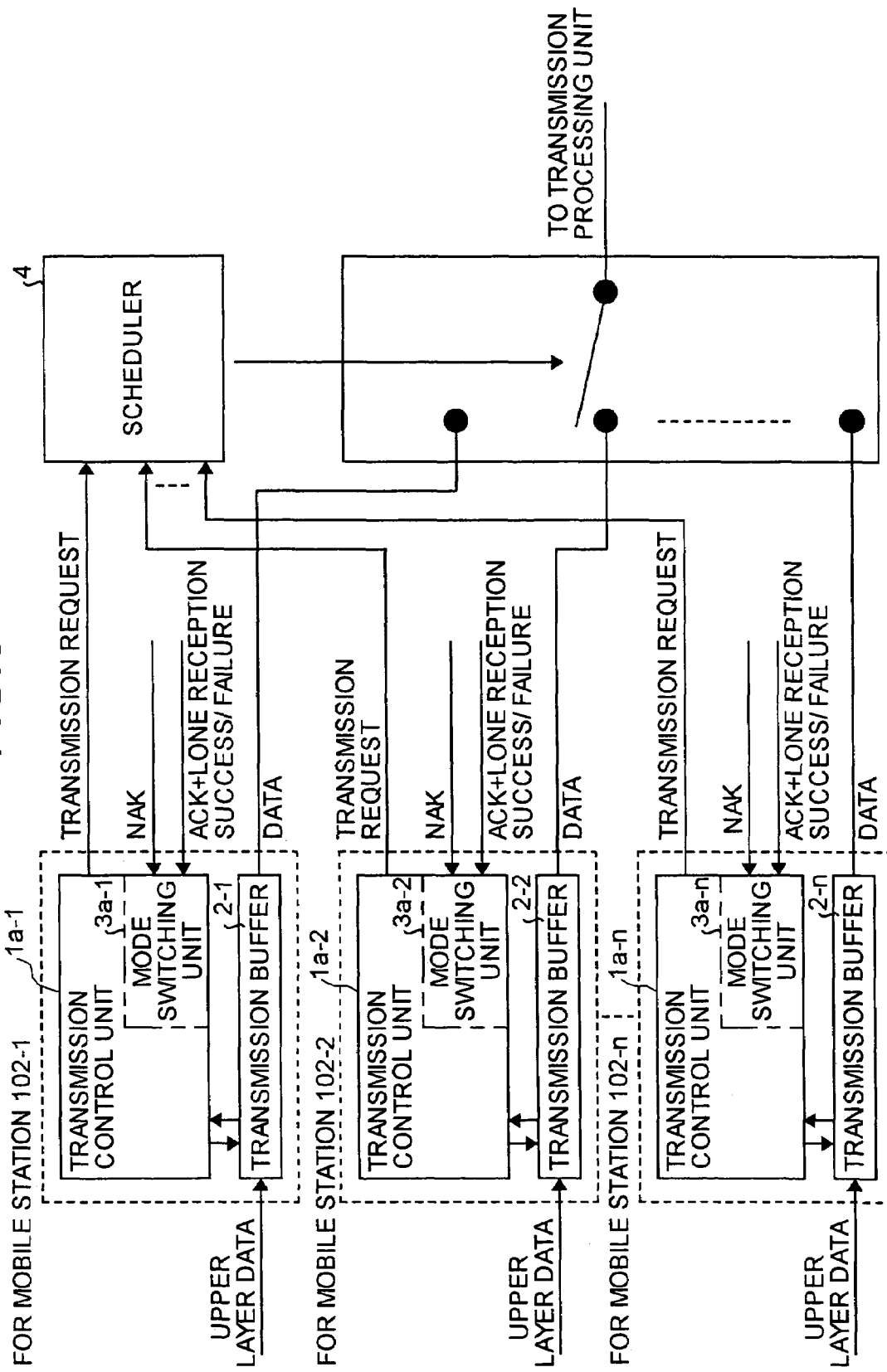
FIG. 3 is a transmitting station according to a second embodiment of the present invention.

FIG. 3 illustrates a transmitting station according to the second embodiment of the present invention. Reference numerals 1a-1, 1a-2, . . . , 1a-n designate transmission control units while 3a-1, 3a-2, . . . , 3a-n designate mode switching units provided in the respective transmission control units. Meanwhile, like references indicate functionally similar elements as the above described first embodiment, and therefore redundant explanation is not repeated. In what follows, only the operation that is different from that in the first embodiment is described for the sake of continence.

Figure 4:
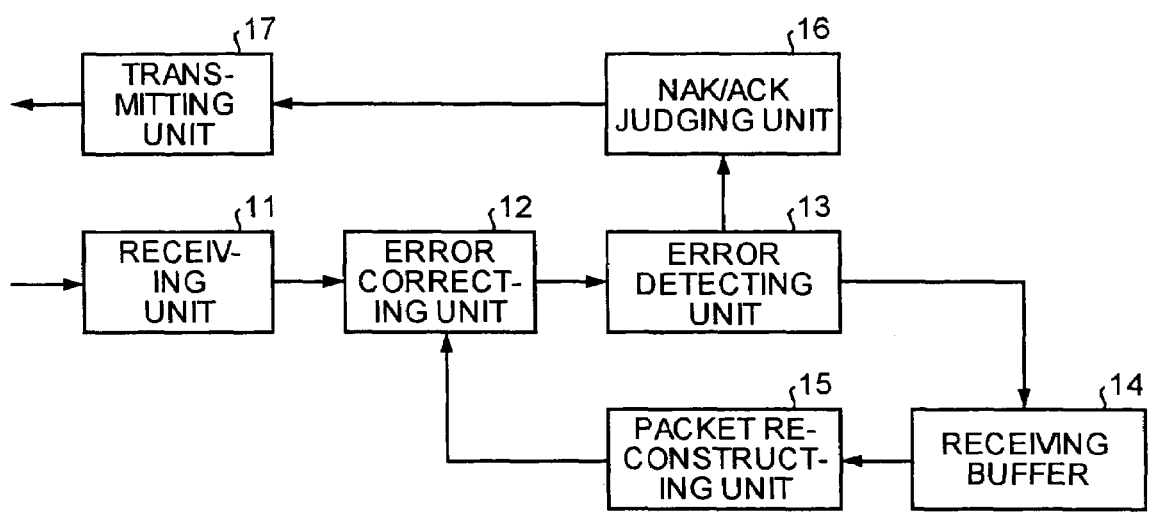
FIG. 4 is a receiving station according to the second embodiment of the present invention.

FIG. 4 illustrates a receiving station according to the second embodiment of the present invention. Reference numeral 11 designates a receiving unit; 12 designates an error correcting unit; 13 designates an error detecting unit; 14 designates a receiving buffer; 15 designates a packet reconstructing unit; 16 designates an NAK/ACK judging unit; and 17 designates a transmitting unit.

In the receiving station, the receiving unit 11 serves to demodulate signals received from the transmitting station while the error correcting unit 12 serves to perform error correction of the data obtained by the demodulation. The error detecting unit 13 then judges whether or not an error is detected, and saves the data in the receiving buffer 14 if an error exists in a frame which is firstly received. On the other hand, if an error exists in a retransmitted frame, the retransmitted frame data is combined with the frame data stored in the receiving buffer 14 by the packet reconstructing unit 15. The frame data as combined is given an error correcting treatment and an error detecting treatment again. Upon reception of the error detection result, the NAK/ACK judging unit 16 sends an NAK if an error exists in the new frame data. Conversely, if no error exists in the new frame, the NAK/ACK judging unit 16 sends an ACK together with additional information indicative of "lone reception failure" when an error exists in the retransmitted frame or "lone reception success" when no error exists in the retransmitted frame. The transmitting unit 17 modulates data received from the NAK/ACK judging unit 16 according to a predetermined modulation scheme and then transmits the modulated data.

Figure 5:
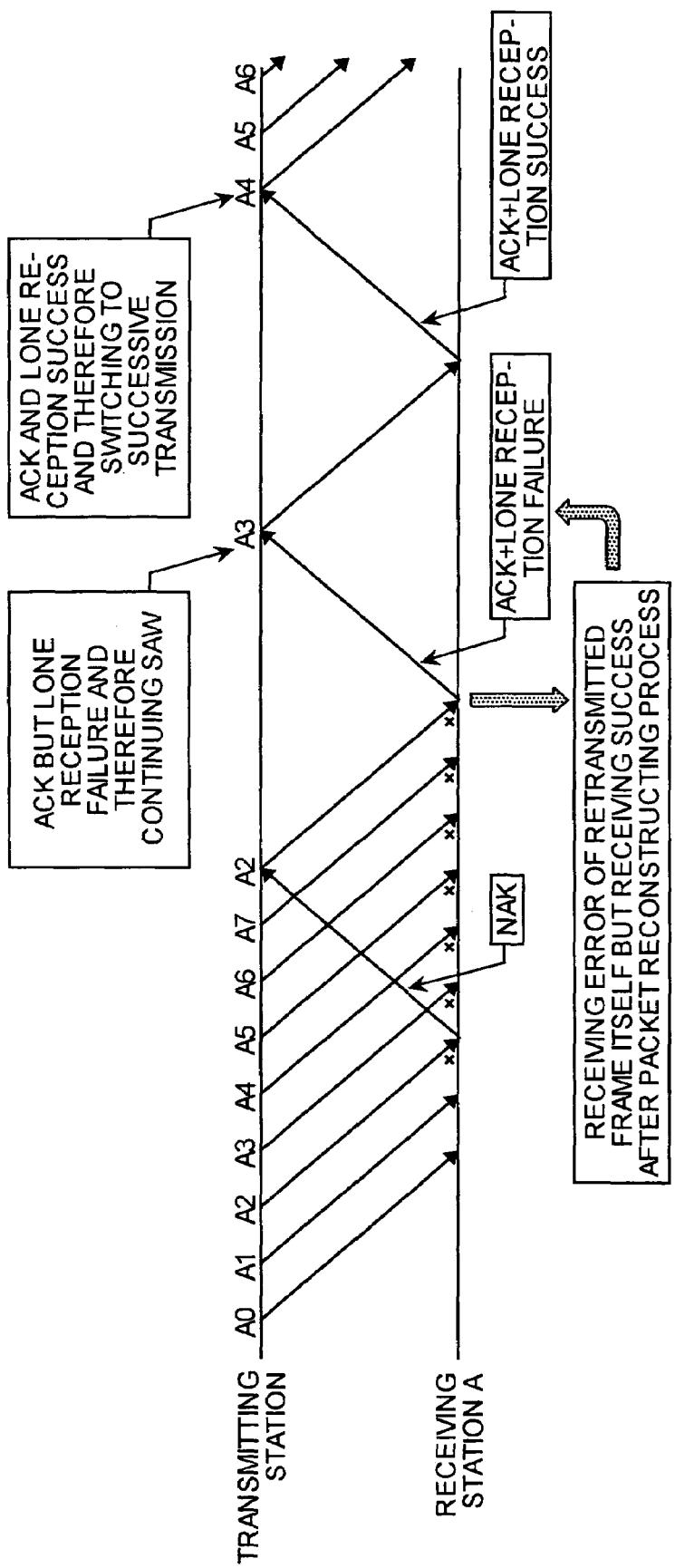
FIG. 5 is to explain the communication method according to the second embodiment.

FIG. 5 is to explain the communication method according to the second embodiment. Only the operation that is different from that in the first embodiment is described here for the sake of convenience. First, the receiving station A transmits an NAK corresponding to the receiving error of a frame "A2" in the same manner as in the first embodiment. The transmitting station that receives the NAK then retransmits the frame "A2" and switches the operation mode to the SAW mode in the same manner as in the first embodiment.

If a receiving error occurs again in the retransmitted frame "A2" itself while no error exists in the frame reconstructed by the packet reconstructing process, the receiving station A transmits an ACK together with additional information indicative of "lone reception failure".

Upon reception of the "lone reception failure", the transmitting station continues the SAW mode according to the ACK and transmits the frame "A3" as the next frame. Conversely, if no error exists in the frame "A3" itself, the receiving station A transmits an ACK together with additional information indicative of "lone reception success".

Upon reception of the "lone reception success", the transmitting station switches the operation mode from the SAW mode to the successive transmitting mode according to the ACK and transmits frames "A4", "A5", "A6" and so on.

According to the second embodiment, when a receiving error occurs in a retransmitted frame itself while no error exists in the frame obtained by the packet reconstructing process, the SAW mode is continued, even if an ACK is received for notification of reception success, and the SAW mode is switched to the successive transmitting mode only when an ACK is received after a retransmitted frame itself is transmitted without error. By this configuration, more channels are assigned only to communications providing a better communication quality.

Figure 6:
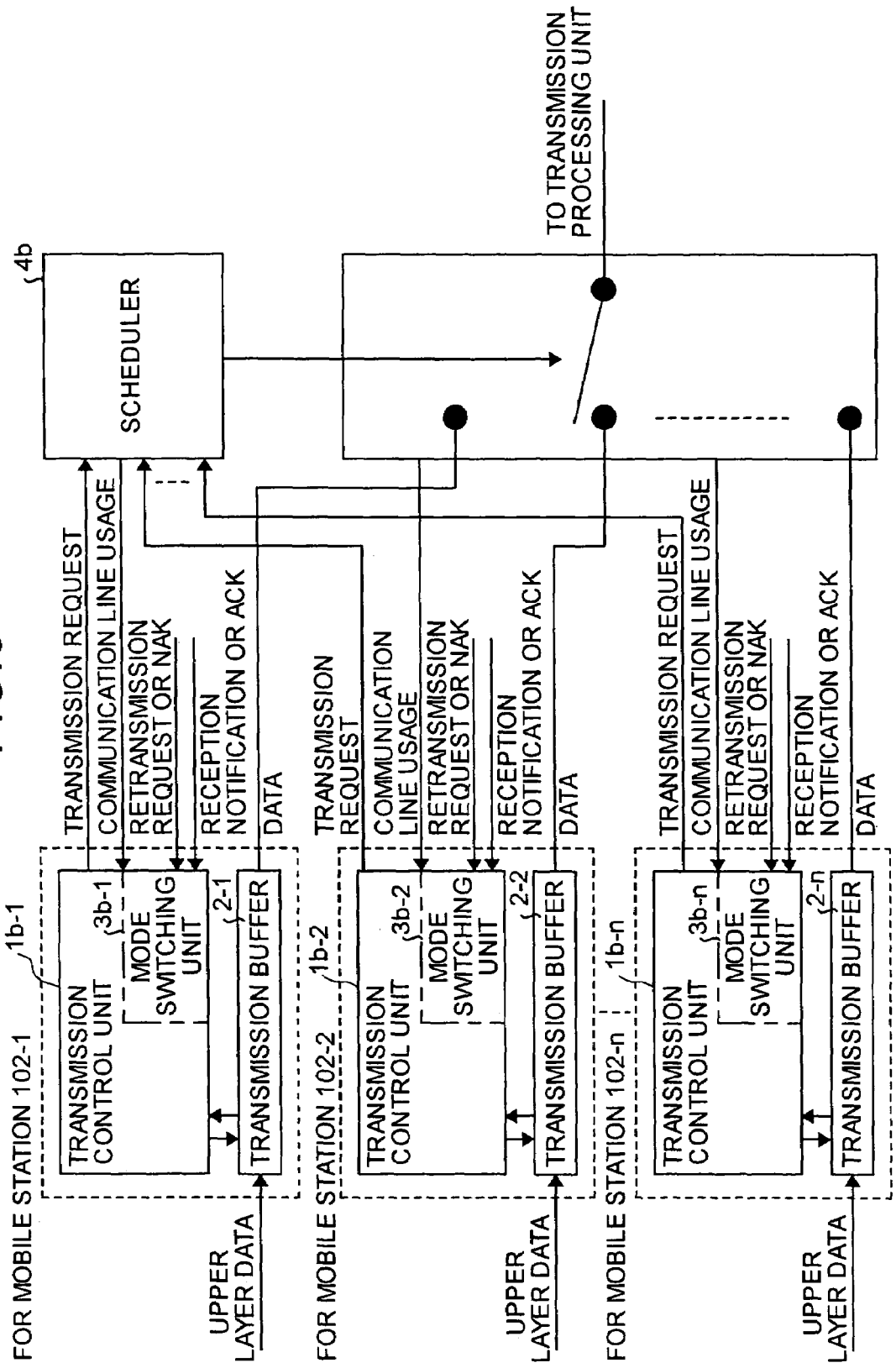
FIG. 6 is a communication device (transmitting station) according to a third embodiment of the present invention.

Next, a third embodiment will be explained. FIG. 6 is a communication device (transmitting station) according to the third embodiment of the present invention. This embodiment is suitable for the case where the number of receiving stations requiring a channel is small. Reference numerals 1b-1, 1b-2, . . . , 1b-n designate transmission control units; 3b-1, 3b-2, . . . , 3b-n designate mode switching units provided in the respective transmission control units; and 4b designates a scheduler. Meanwhile, like references indicate functionally similar elements as the above described first embodiment, and therefore redundant explanation is not repeated. In what follows, only the operations different from the first embodiment are described.

The scheduler 4b serves to notify the respective mode switching units of the current communication line usage. The respective mode switching units refrain from switching to the SAW mode but continue sending requests for retransmission and successive transmission in the GBN mode, even if a retransmission request or an NAK is received from a receiving station, if the current communication line usage indicates that the number of other receiving stations utilizing the communication line is smaller than a predetermined number.

Figure 7:
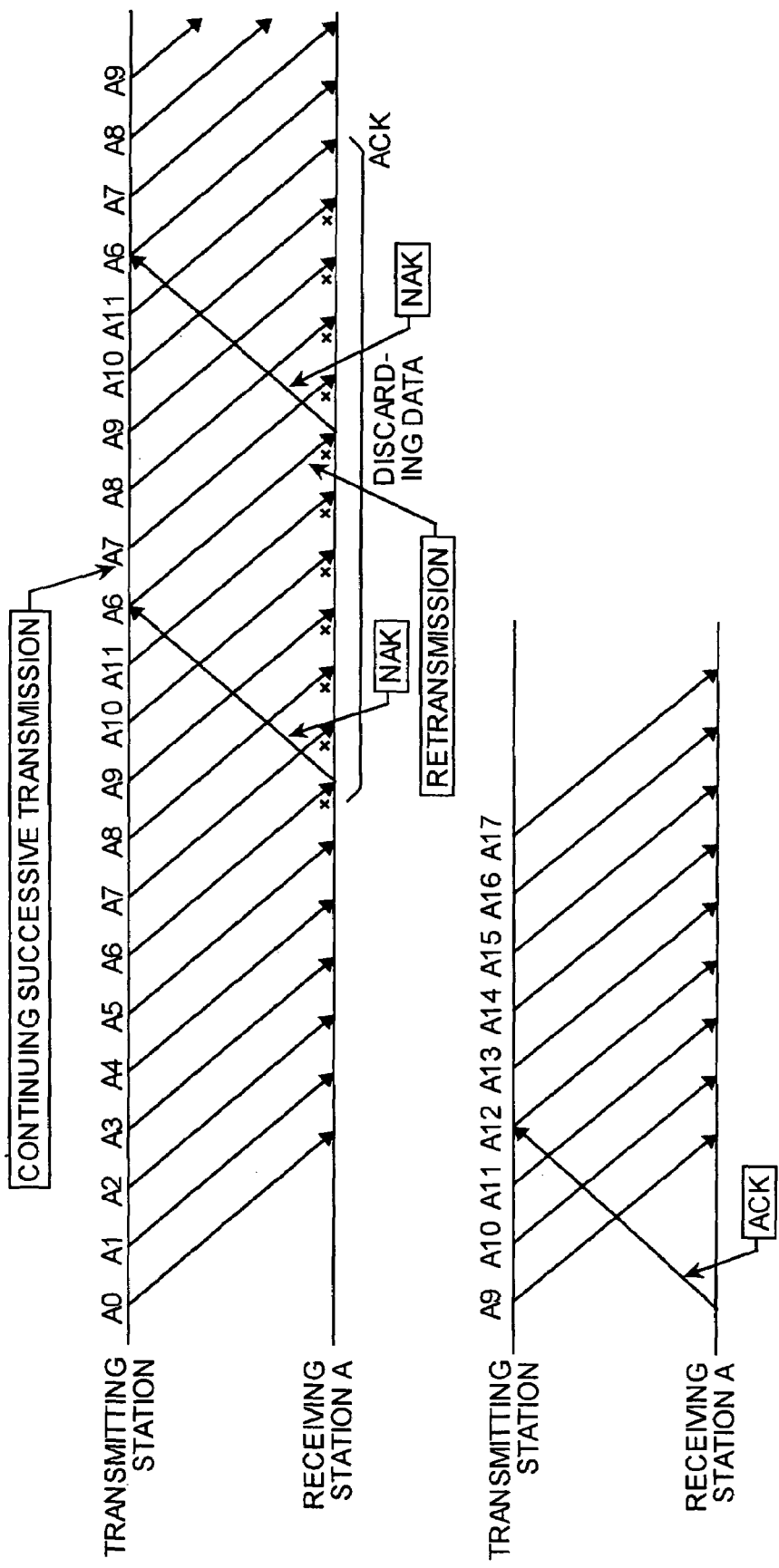
FIG. 7 is to explain the communication method according to the third embodiment.

FIG. 7 is to explain the communication method according to the third embodiment. If a receiving error occurs in a frame "A6", the receiving station A sends an NAK. Upon reception of the NAK, the transmitting station judges whether the operation mode is to be switched to the SAW mode or to the GBN mode for retransmission with reference to the above current communication line usage. It is assumed here, for the sake of explanation, that there is no other receiving station that is using the communication line. In this case, the mode switching unit switches the operation mode to the GBN mode and continues sending requests for successive transmission.

According to the third embodiment, a mode switching unit in the transmitting station continues successive transmission of frames, even if a retransmission request or an NAK is received, when the number of other receiving stations utilizing the communication line is smaller than a predetermined number. By this configuration, it is possible to avoid undesirable situations that there is no receiving station utilizing a channel and therefore to maximize the channel usage.

Figure 8:
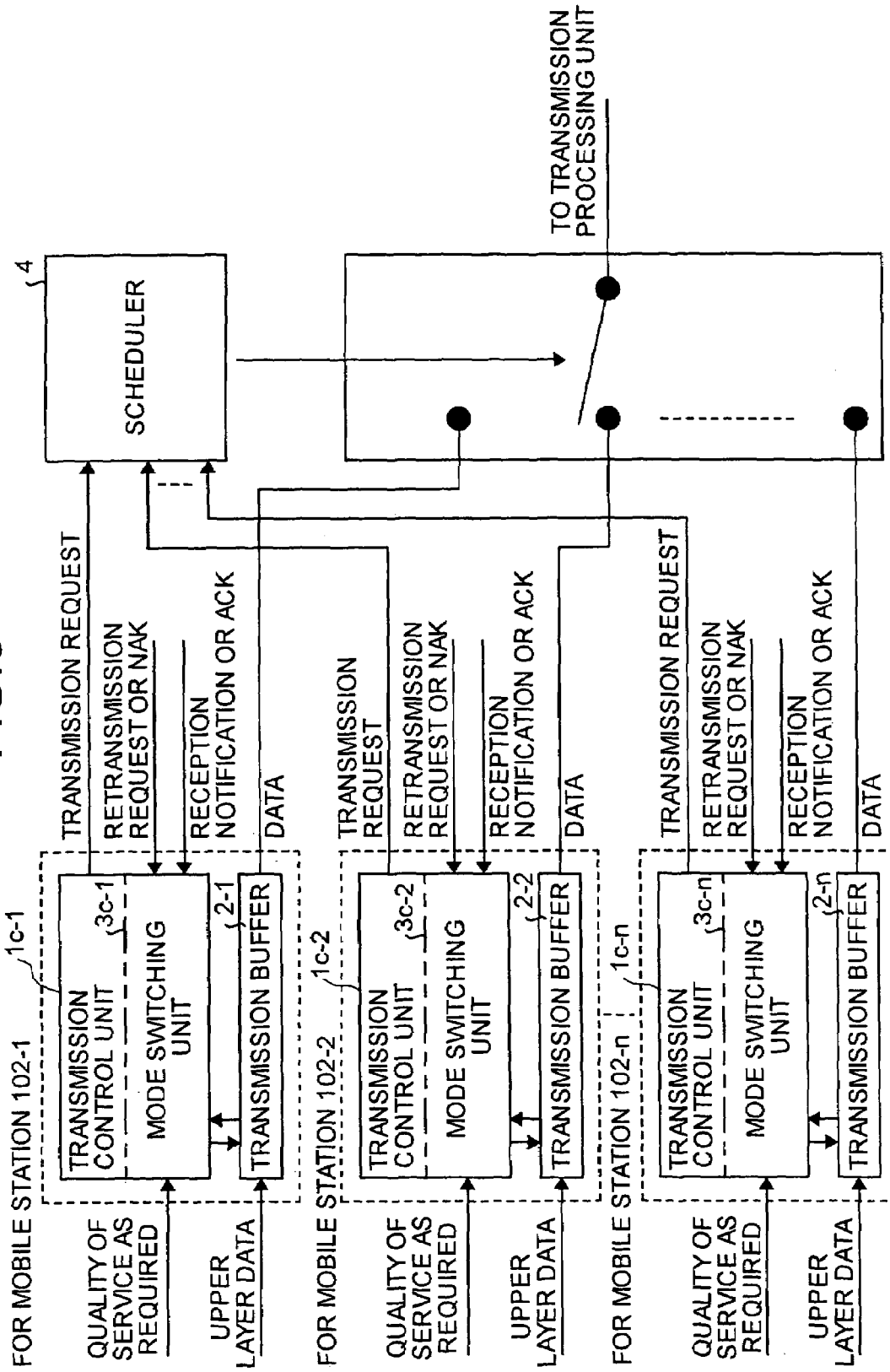
FIG. 8 is a communication device (transmitting station) according to a fourth embodiment of the present invention.

Next, a fourth embodiment will be explained. FIG. 8 is a communication device (transmitting station) according to the fourth embodiment of the present invention. This embodiment is suitable for the case including "communication requiring the maintenance of transmission delays". Reference numerals 1*c*-1, 1*c*-2, . . . , 1*c*-*n* designate transmission control units while 3*c*-1, 3*c*-2, . . . , 3*c*-*n* designate mode switching units provided in the respective transmission control units. Meanwhile, like references indicate functionally similar elements as the above described first embodiment, and therefore redundant explanation is not repeated. In what follows, only the operations different from the first embodiment are described.

The respective transmission control units as described above are notified of information relating to a quality of service as required from an upper layer. The respective mode switching units refrain from switching to the SAW mode but continue sending requests for retransmission and successive transmission in the GBN mode, even if a retransmission request or an NAK is received from a receiving station, in the case where the maintenance of transmission delays is required in the communication. Meanwhile, the procedure of the communication method is similar to the method as described with reference to FIG. 7.

According to the fourth embodiment, a mode switching unit in the transmitting station continues successive transmission of frames, in the case of communications requiring the maintenance of transmission delays, even if a retransmission request or an NAK is received. By this configuration, when the communication line causing receiving errors is recovered, the successive transmission of frames immediately becomes effective to maintain transmission delays.

Next, the characteristics of the fifth embodiment will be explained. In the case of the first to fourth embodiments described above, the transmission of frames is continued at a low transmission rate even if a transmitting station receives an NAK. As a result, even if the quality of communication line is low, a low capacity communication line is provided so that it is possible to instantaneously respond to the recovery by constantly monitoring the recovery status of the quality of communication line. Particularly, when a packet reconstructing process is used as described in the second embodiment, a communication is continued even at a low rate so that minimum services can be provided. Contrary to this, in the fifth embodiment, when the quality of communication line is degraded, the transmission control unit corresponding to the communication stops sending a transmission request. Namely, the transmission control unit takes back a communication channel from the corresponding receiving station and resumes sending successive transmission requests only when the transmission control unit is notified of the recovery of the quality of communication line via a control channel from the receiving station.

Figure 9:
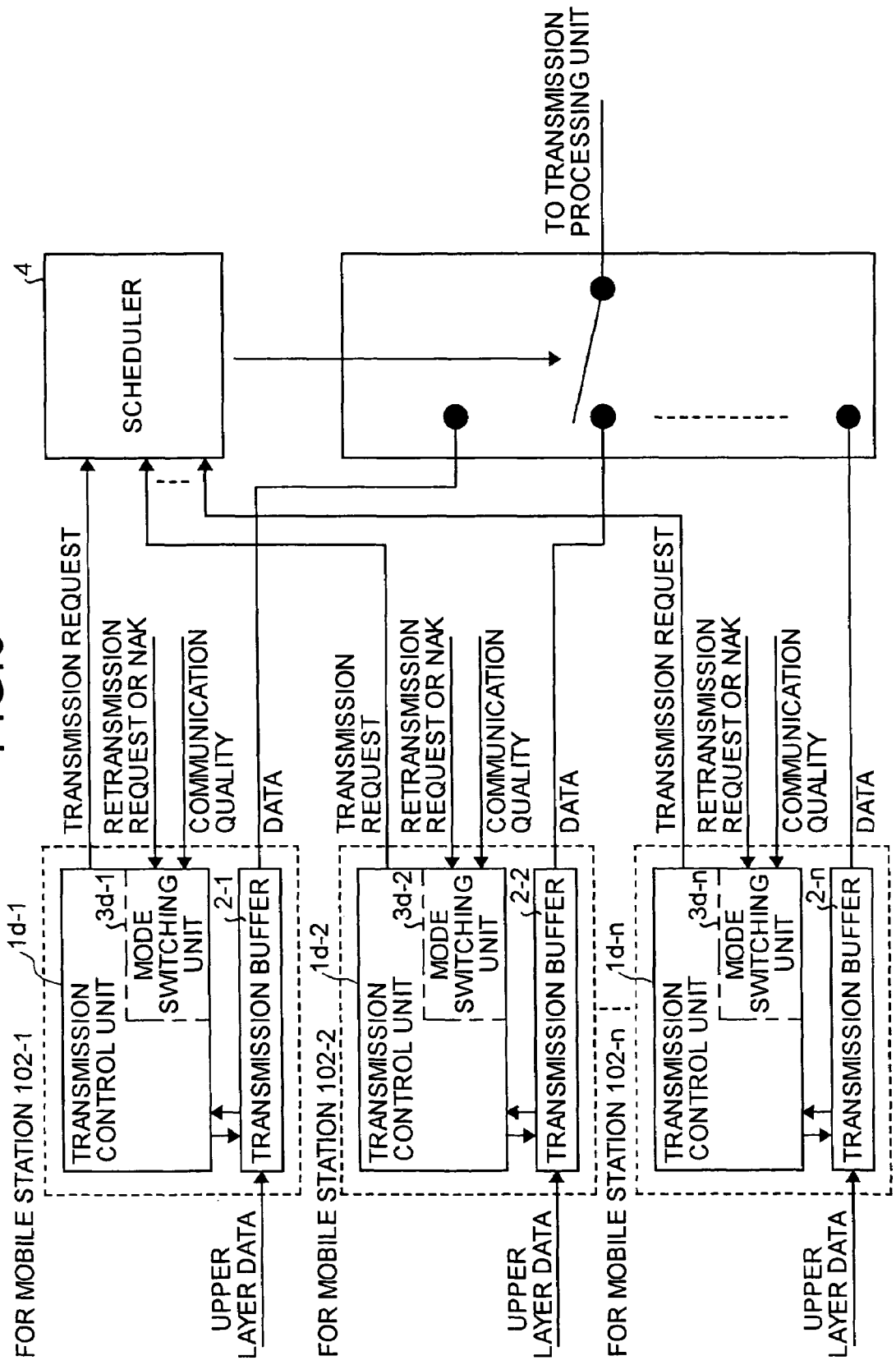
FIG. 9 is a communication device (transmitting station) according to a fifth embodiment of the present invention.

FIG. 9 is a communication device (transmitting station) according to the fifth embodiment of the present invention. Reference numerals 1*d*-1, 1*d*-2, . . . , 1*d*-*n* designate transmission control units while 3*d*-1, 3*d*-2, . . . , 3*d*-*n* designate mode switching units provided in the respective transmission control units. Meanwhile, like references indicate functionally similar elements as the above described first embodiment, and therefore redundant explanation is not repeated. In what follows, only the operations different from the first embodiment are described.

With the respective transmission control units, upon reception of a retransmission request or an NAK, the corresponding transmission control unit stops sending transmission requests and checks the recovery status with reference to the information about the quality of communication line received from the corresponding receiving station. Then, if the quality of communication line is judged to be recovered, the corresponding transmission control unit resumes sending transmission requests for frames with retransmission data in the lead to the scheduler 4.

Figure 10:
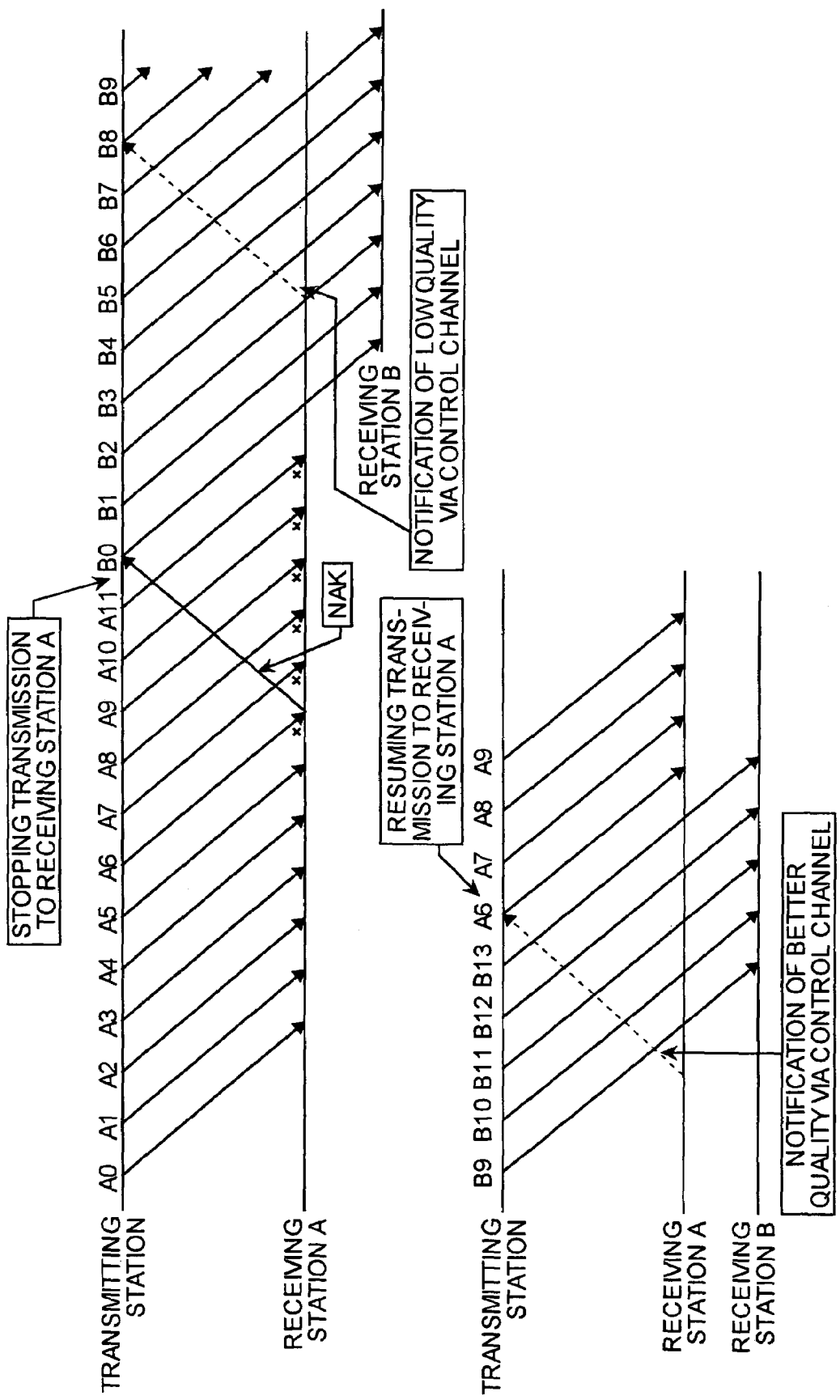
FIG. 10 is to explain the communication method according to the fifth embodiment.

FIG. 10 is to explain the communication method according to the fifth embodiment. First, the transmitting station assigns a channel for communication with the receiving station A and transmits frames in the successive transmitting mode. For example, when a receiving error occurs in a frame "A6", the receiving station A sends a retransmission request (NAK) for the frame "A6". Upon reception of the NAK of the frame "A6", the transmitting station completely stops transmission to the receiving station A, and assigns the channel, for example, to a receiving station B for successively transmitting frames.

While refraining from sending frames to the receiving station A, the transmitting station checks "information relating to the quality of communication line" as notified by the receiving station A through the control channel. For example, while the stoppage of transmission is continued as long as the quality of communication line is low, successive transmission of frames is resumed to the receiving station A as soon as the quality of communication line is recovered. Incidentally, the receiving station measures the quality of communication signals on all the channels which can be received by receiving stations located within the coverage of the transmitting station.

According to the fifth embodiment, upon reception of an NAK, the transmitting station completely stops requesting transmission to a receiving station associated with a receiving error, and makes use of the channel for transmitting frames to another receiving station. Also, the transmission control unit is designed to monitor the quality of communication line as notified and transmitted through the control channel from the receiving station associated with a receiving error in order to judge whether or not successive transmission is to be resumed.

According to the present invention, it is possible to avoid the condition that a channel is vainly assigned irrespective of a low communication quality encountered in the prior art technique.

Moreover, more channels can be assigned to communications providing a better communication quality.

Furthermore, it is possible to avoid undesirable situations that there is no receiving station utilizing a channel and therefore to maximize the channel usage.

Moreover, when the communication line causing receiving errors is recovered, the successive transmission of frames immediately becomes effective to maintain transmission delays.

Furthermore, when the quality of a communication line is too low to fix a receiving error even by the packet reconstructing process, it is possible to avoid wasted channel assignments.

Moreover, a transmitting station can preferentially assign a channel to a receiving station capable of providing a better communication quality without the need for monitoring the quality of data of a communication line transmitted from receiving stations. Also, the channel assignment to the communication is halted without delay in response to the reception of a retransmission request.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

As described above, the communication method according to the present invention is effective for a communication system making use of an ARQ (Automatic Repeat request) scheme and, in particular, suitable for the use in an environment in which the quality of communication line may be degraded due to noise or the communication interference from another station.

The invention claimed is:

1. A communication method of performing channel assignment between a transmitting station and a plurality of receiving stations according to an ARQ (Automatic Repeat request) scheme, comprising:

the transmitting station assigning a communication channel to at least one receiving station from among the plurality of receiving stations to perform successive transmission of frames with the one receiving station;

the transmitting station receiving, from a requestor receiving-station from among the receiving stations to which the transmitting station has assigned the communication channel, a retransmission request indicating retransmission of a particular frame;

the transmitting station switching the communication with the requestor receiving-station to a communication according to an SAW (Stop and Wait) scheme that is one implementation of the ARQ scheme;

the transmitting station retransmitting the particular frame according to the SAW scheme to the requester receiving-station;

the transmitting station assigning the communication channel that is assigned to the requestor receiving-station to another receiving station, by making use of the fact that there is a decrease in a number of frames to be transmitted in the SAW scheme, and giving a priority to the communication with the another receiving station;

the transmitting station switching the communication with the requestor receiving-station to a successive transmission upon reception from the requestor receiving-station of a reply signal indicative of reception of the particular frame as retransmitted without error, and giving a priority to the communication with the requestor receiving-station.

2. The communication method according to claim 1, further comprising:

the requestor receiving-station sending, to the transmitting station, the reply signal that includes information indicative of reception of the frame as retransmitted without error upon reception of the particular frame as retransmitted without error; and the requestor receiving-station sending, to the transmitting station, a second reply signal that includes information indicative of a receiving error upon reception of the particular frame as retransmitted with error and upon obtaining a frame with no error in a packet reconstructing process, wherein the transmitting station continues the communication with the requestor receiving-station according to the SAW scheme upon reception of the second reply signal.

3. The communication method according to claim 1, wherein when the transmitting station receives the retransmission request from the requestor receiving-station while the number of receiving stations to which the communication line is assigned is smaller than a predetermined number, the switching of the communication to the SAW scheme includes switching the communication established with the requestor receiving-station to a communication according to a GBN (Go Back N) scheme which is one implementation of the ARQ scheme.

4. The communication method according to claim 1, wherein when the transmitting station receives the retransmission request from the requestor receiving-station while the maintenance of transmission delays is required by an upper layer as a quality of service, the switching of the communication to the SAW scheme includes switching the communication established with the requestor receiving-station to a communication according to a GBN (Go Back N) scheme which is one implementation of the ARQ scheme.

5. A communication method of performing channel assignment between a transmitting station and a plurality of receiving stations, comprising:

the transmitting station assigning a communication channel to at least one receiving station from among the plurality of receiving stations to perform successive transmission of frames with the one receiving station;

the transmitting station receiving, from a requestor receiving-station from among the receiving stations to which the transmitting station has assigned the communication channel, a retransmission request;

the transmitting station stopping the communication established with the requestor receiving-station;

the transmitting station assigning the communication channel to a receiving station other than the requester receiving-station and giving a priority to the communication with that other receiving station;

the transmitting station checking whether information relating to a quality of communication line has been received from the requestor receiving-station, and upon the information relating to the quality of communication line indicating that the quality of communication line has recovered, resuming communication with the requestor receiving-station.

6. A communication system that includes a transmitting station and a plurality of receiving stations, wherein the transmitting station includes a unit that assigns a communication channel to at least one receiving station from among the plurality of receiving stations to perform successive transmission of frames with the one receiving station;

receives, from a requestor receiving-station from among the receiving stations to which the transmitting station has assigned the communication channel, a retransmission request indicating retransmission of a particular frame;

switches the communication with the requestor receiving-station to a communication according to an SAW (Stop and Wait) scheme that is one implementation of an ARQ (Automatic Repeat request) scheme;

retransmits the particular frame according to the SAW scheme to the requester receiving-station;

assigns the communication channel that is assigned to the requestor receiving-station to a receiving station other that the requestor receiving-station, by making use of the fact that there is a decrease in a number of frames to be transmitted in the SAW scheme and giving a priority to the communication with that other receiving station;

switches the communication with the requestor receiving-station to the successive transmission upon reception from the requester receiving-station of a reply signal indicative of reception of the particular frame as retransmitted without error, and gives a priority to the communication with the requestor receiving-station.

7. The communication system according to claim 1, wherein the requestor receiving-station includes a unit that sends, to the transmitting station, the reply signal that includes information indicative of reception of the frame as retransmitted without error upon reception of the particular frame as retransmitted without error; and sends, to the transmitting station, a second reply signal that includes information indicative of a receiving error upon reception of the particular frame as retransmitted with error and upon obtaining a frame with no error in a packet reconstructing process, wherein the transmitting station continues the communication with the requestor receiving-station according to the SAW scheme upon reception of the second reply signal.

8. The communication system according to claim 6, wherein when the unit in the transmitting station receives the retransmission request from the unit in the requestor receiving-station while the number of receiving stations to which the communication line is assigned is smaller than a predetermined number, the unit in the transmitting station switches the communication established with the requestor receiving-station to a communication according to a GBN (Go Back N) scheme which is one implementation of the ARQ scheme.

9. The communication system according to claim 6, wherein when the unit in the transmitting station receives the retransmission request from the unit in the requestor receiving-station while maintenance of transmission delays is required by an upper layer as a quality of service, the unit in the transmitting station switches the communication established with the requestor receiving-station to a communication according to a GBN (Go Back N) scheme which is one implementation of the ARQ scheme.

10. A communication system that includes a transmitting station and a plurality of receiving stations, wherein the transmitting station includes a unit that:

assigns a communication channel to at least one receiving station from among the plurality of receiving stations to perform successive transmission of frames with the one receiving station;

receives, from a requestor receiving-station from among the receiving stations to which the transmitting station has assigned the communication channel, a retransmission request;

stops the communication established with the requestor receiving-station;

assigns the communication channel to a receiving station other than the requester receiving-station and giving a priority to the communication with that other receiving station;

checks whether information relating to a quality of communication line has been received from the requestor receiving-station, and upon the information relating to the quality of communication line indicating that the quality of communication line has recovered, resumes communication with the requestor receiving-station.

11. A transmitting side communication device that assigns a channel to a plurality of receiving side communication devices according to an ARQ (Automatic Repeat request) scheme, comprising a unit that:

assigns a communication channel to at least one receiving side communication device from among the plurality of receiving side communication devices to perform successive transmission of frames with the one receiving side communication device;

receives, from a requestor receiving side communication device from among the receiving side communication devices to which the transmitting station has assigned the communication channel, a retransmission request indicating retransmission of a particular frame;

switches the communication with the requestor receiving side communication device to a communication according to an SAW (Stop and Wait) scheme that is one implementation of the ARQ scheme;

retransmits the particular frame according to the SAW scheme to the requestor receiving side communication device;

assigns the communication channel that is assigned to the requestor receiving side communication device to a receiving side communication device other that the requester receiving side communication device, by making use of the fact that there is a decrease in a number of frames to be transmitted in the SAW scheme and giving a priority to the communication with that other receiving side communication device;

switches the communication with the requestor receiving side communication device to successive transmission upon reception from the requestor receiving side communication device of a reply signal indicative of reception of the particular frame as retransmitted without error, and gives a priority to the communication with the requestor receiving side communication device.

12. The transmitting side communication device according to claim 11, wherein the unit:

upon reception of the reply signal together with information indicative of correct reception of a retransmitted frame in response to retransmission, returns communication with the requestor receiving side communication device as the retransmission to the successive transmission; and upon reception of a second reply signal together with information indicative a receiving error of a retransmitted frame in response to retransmission, continues the communication with the requestor receiving side communication device according to the SAW scheme.

13. The transmitting side communication device according to claim 11, wherein when the unit receives the retransmission request from the requestor receiving side communication device while a number of receiving side communication device to which the communication line is assigned is smaller than a predetermined number, the unit switches the communication established with the requestor receiving side communication device to a communication according to a GBN (Go Back N) scheme which is one implementation of the ARQ scheme.

14. The transmitting side communication device according to claim 11, wherein when the unit receives the retransmission request from the requestor receiving side communication device while maintenance of transmission delays is required by an upper layer as a quality of service, the unit switches the communication established with the requestor receiving side communication device to a communication according to a GBN (Go Back N) scheme which is one implementation of the ARQ scheme.

15. A transmitting side communication device that assigns a channel to a plurality of receiving side communication devices, comprising a unit that:

assigns a communication channel to at least one receiving station from among the plurality of receiving stations to perform successive transmission of frames with the one receiving station;

receives, from a requestor receiving-station from among the receiving stations to which the transmitting station has assigned the communication channel, a retransmission request;

stops the communication established with the requester receiving-station;

assigns the communication channel to a receiving station other than the requester receiving-station and gives a priority to the communication with that other receiving station;

checks whether information relating to a quality of communication line has been received from the requester receiving-station, and upon receiving line quality information indicating that the quality of communication line has recovered, resumes communication with the requestor receiving-station.

16. A receiving communication device that performs a communication with a transmitting side communication device according to an ARQ scheme, comprising a unit that:

upon correctly receiving a frame retransmitted from the transmitting side communication device, transmits a first reply signal together with information indicative of correct reception of a retransmitted frame to the transmitting side communication device; and upon detecting that a retransmitted frame causes a receiving error again and if a frame obtained by a packet reconstructing process includes no error, transmits a second reply signal together with information indicative of a receiving error of a retransmitted frame to the transmitting side communication device.

* * * * *